Sept. 22, 1970 MASAO FUKATA ET AL 3,530,472
CUE SIGNAL COMMUNICATION SYSTEM
Filed Jan. 17, 1967 5 Sheets-Sheet 2

United States Patent Office 3,530,472
Patented Sept. 22, 1970

3,530,472

CUE SIGNAL COMMUNICATION SYSTEM

Masao Fukata, Yoshikazu Sato, and Shozo Takahashi, Tokyo-to, Japan, assignors to Kokusai Denki Kabushiki Kaisha, Tokyo-to, Japan, a joint-stock company of Japan Filed Jan. 17, 1967, Ser. No. 609,929
Claims priority, application Japan, Aug. 24, 1966, 41/55,270
Int. Cl. H04b 7/00
U.S. Cl. 343—228 8 Claims

ABSTRACT OF THE DISCLOSURE

A system is disclosed for transmitting a cue signal or a plurality of cue signals by use of at least one wobbled wave obtained by wobbling a low-frequency sinusoidal wave according to a saw-tooth wave function the number of cycles of which is determined in accordance with the cue signal to be transmitted. The transmitted wobbled wave is applied to a narrow-pass band filter and changed into a pulse train the number of pulses of which is equal to the number of cycles of the saw-tooth wave and the pulses of which have a constant period irrespective of any slight deviation of the wobbling frequency range and/or slight deviation of the center frequency of the narrow-pass band filter. The transmitted cue signal is detected by counting the number of pulses of the pulse train in consideration of the constant period of pulses.

This invention relates to a communicaion system of cue signal or signals.

In the conventional transmission system of cue signals using at least one carrier wave of constant frequency or at least one modulated carrier wave, the transmitted wave or waves is/are generally detected through a selection filter or filters of narrow pass-band at the receiving side since the transmission wave or waves is/are liable to be disturbed in the transmission medium by interference waves or noise. In this case, it is desirable that the bandwidth of the selection filter is made narrower as far as possible to prevent such disturbances. However, if the selection filter is designed to have a very narrow-pass band to receive a transmitted wave, the transmitted wave must have an extremely high stability of frequency and the center frequency of the selection filter in the receiver has to precisely coincide with the frequency of the transmitted wave. Moreover, if the transmitted wave is received at a plurality of receiving stations, the transmitted wave cannot be reliably detected unless selection filters at all the receiving stations have narrow frequency bandwidths which are equivalent to one another and suitable to detect the transmitted wave. In actuality, however, it is very difficult to sufficiently meet such requirements.

An object of this invention is to provide a communication system for a cue signal or signals in which the abovementioned disadvantages of the conventional system can be overcome.

Another object of this invention is to provide a communication system of cue signals capable of reliably transmitting a considerable number of cue signals in keeping with an extremely high protection ratio as to interference waves or noise.

Another object of this invention is to provide a communication system of cue signals capable of reliably transmitting a considerable number of cue signals in keeping with conditions where a considerable tolerance of the carrier wave and/or a considerable deviation of the center frequency of the selection filter is/are allowable.

Another object of this invention is to provide a communication system of a cue signal or signals capable of reliably detecting the transmitted cue signal or signals without spurious triggering.

These and other objects of this invention can be attained by the system of the present invention for transmitting a cue signal or signals, comprising a generator for generating a wobbled wave by slightly wobbling a low-frequency sinusoidal wave along a saw-tooth wave the number of cycles of which is determined in accordance with the cue signal to be transmitted; transmitter means for transmitting the wobbled wave into a transmission medium; receiver means for receiving the transmitted wobbled wave from the transmission medium; a filter coupled with the receiver means and having a narrow-pass band considerably narrower than the wobbling frequency deviation of the transmitted wobbled wave, thereby producing a pulse train the period of pulses of which is substantially the same as that of the saw-tooth wave and the number of pulses of which corresponds to the number of cycles of the saw-tooth wave; and detection means for determining the transmitted cue signal corresponding to the pulse train.

The novel features of this invention are set forth with particularity in the appended claims, however this invention, as to its construction and operation together with other objects and advantages thereof, may best be understood by reference to the following description, taken in connection with the accompanying drawings, in which the same parts are designated by the same characters, numerals and symbols throughout all the figures, and in which:

Figure 1:
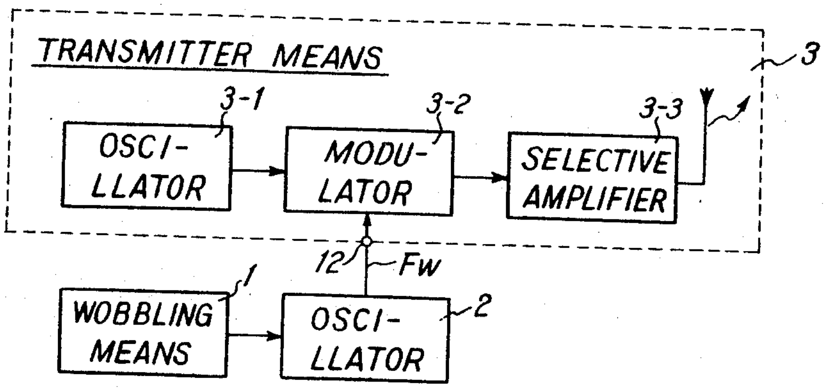
FIG. 1 is a block diagram for illustrating an example of the transmitter side of the system according to this invention.
Figure 2:
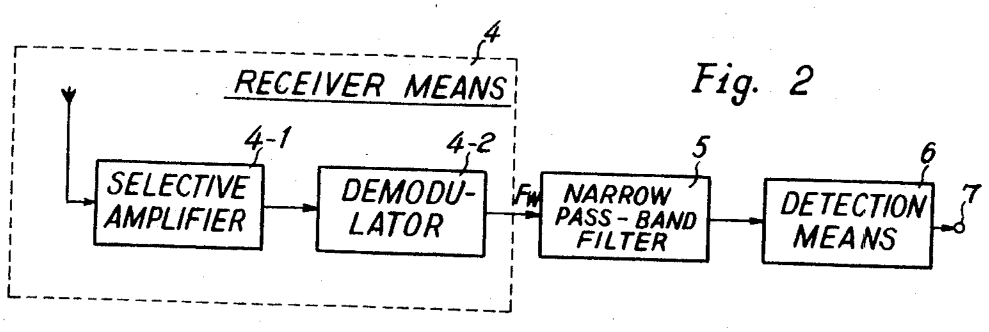
FIG. 2 is a block diagram for illustrating one embodiment of the receiver side of the system according to this invention.
Figures 3A, 3B:
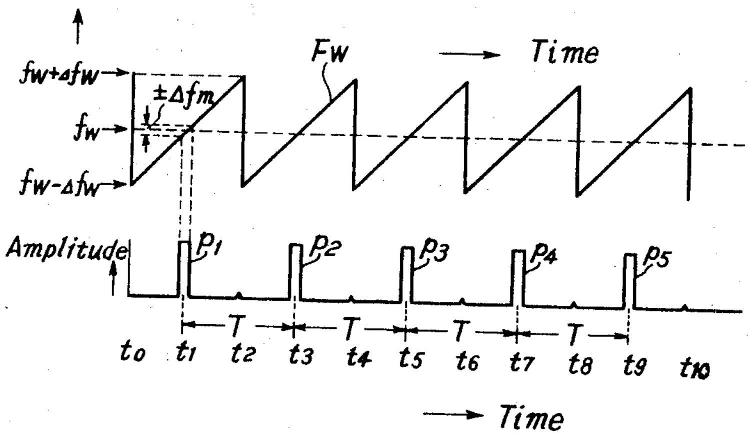
FIGS. 3A, 3B, 4A, 4B, 5A and 5B are wave form diagrams for describing operations of the system of this invention.

Referring to FIGS. 1 and 2, the system of this invention applied to radio communication will now be described. The transmitter side of the system comprises, as is shown in FIG. 1, wobbling means 1, an oscillator 2 and transmitter means 3. The oscillator 2 generates a low-frequency (e.g. audio frequency) sinusoidal wave $fw$ in case of no wobbling of the wobbling means 1. The wobbling means 1 is employed for slightly wobbling, in accordance with a cue signal to be transmitted, the low-frequency wave $fw$ along a saw-tooth wave form. Accordingly, a generator composed of the oscillator 2 and the wobbling means 1 produces a wobbled wave $Fw$, which is wobbled within a frequency $(fw-\Delta fw)$ to a frequency $(fw+\Delta fw)$ according to a saw-tooth wave function as is shown in FIG. 3A. By way of examples, the frequency $fw$ and the wobbling frequency range $(\pm\Delta fw)$ are equal to 1,900 cycles/second and $\pm 5$ cycles/second respectively; and the period of the saw-tooth wave is approximately equal to one second. The wobbled wave F$w$ is applied to the transmitter means 3, which is composed of an oscillator 3–1, a modulator 3–2 and a selective amplifier 3–3. The oscillator 3–1 generates a carrier wave F$c$ having a constant radio frequency. The carrier wave F$c$ is modulated in the modulator 3–2 by use of the wobbled wave F$w$. In this case, frequency-modulation or amplitude modulation can be employed for transmitting the wobbled wave F$w$. The modulated output wave of the modulator 3–2 is applied to the selective amplifier 3–3 which amplifies the modulated wave to emit it into a transmission medium (space) through an antenna.

The receiver side of the system comprises, as is shown in FIG. 2, receiver means 4, a narrow-pass band filter 5 and detection means 6. The receiver means 4 is composed of a selective amplifier 4–1 and a demodulator 4–2. The selective amplifier 4–1 receives, through a receiving antenna, the modulated wave transmitted from the transmitter side and selectively amplifies the received wave. This selective amplifier 4–1 is usually a receiver of superheterodyne type which is composed of at least one high-frequency stage and at least one intermediate-frequency stage. Automatic gain control can be adopted in this selective amplifier 4–1 since the transmitted wave is substantially a sequence signal. The amplified wave is applied to the demodulator 4–2, which is a detector or a frequency discriminator in consideration of the modulation type of the modulated wave transmitted. If the transmitted wave is a frequency-modulated wave, it is desirable that an amplitude-limiter be inserted at the end of the selective amplifier 4–1. In this demodulator 4–2, the modulated wave transmitted is demodulated so as to produce the wobbled wave F$w$. The narrow-pass band filter 5 coupled with the receiver means 4 has a bandwidth $(\pm\Delta fm)$ considerably narrower than the wobbling deviation $(\pm\Delta fw)$ of the transmitted wobbled wave F$w$. It is desirable that the center frequency of the filter 5 is equal to the center frequency $fw$ of the wobbling deviation $(fw\pm\Delta fw)$. However, it is permissible that the center frequency of the filter 5 have a slight amount of deviation unless it is included in the wobbling deviation $(fw\pm\Delta fw)$. The reason for this will be understood by details described below with reference to FIGS. 4A, 4B, 5A and 5B. The filter 5 is, for example, a mechanical filter which has a center frequency 1,900 cycles/second and a bandwidth $\pm 1$ cycle/second to meet with the above-mentioned wobbled wave $(1{,}900\pm 5)$ cycles/second.

As will be understood under said condition, the wobbled wave F$w$ derived from the demodulator 4–2 is changed into a pulse train P shown in FIG. 3B by passing through the filter 5. In this case, the center frequency of the filter 5 is equal to the frequency $fw$. Accordingly, pulses $p_1, p_2, p_3, p_4, p_5$ . . . are generated at times $t_1, t_3, t_5, t_7, t_9$ . . . respectively, since the instantaneous frequency of the wobbled wave F$w$ coincides with the pass-band $(\pm\Delta fm)$ of the filter 5. Moreover, the instantaneous frequency of the wobbled wave F$w$ coincides also at times $t_2, t_4, t_6, t_8, t_{10}$ . . . with the pass-band of the filter 5. However, since frequency shift from the frequency $(fw+\Delta fw)$ to the frequency $(fw-\Delta fw)$ is carried out in an extremely short time, pulses of the times $t_2, t_4, t_6, t_8, t_{10}$ . . . are negligible or have amplitudes considerably smaller than those of the pulses $p_1, p_2, p_3, p_4, p_5$ . . . . Accordingly, the pulse train P is substantially formed by said regular pulses $p_1, p_2, p_3, p_4, p_5$ . . . only. The detection means 5 is composed of a counter by way of example and checks the number of pulses of the pulse train P.

Figures 4A, 4B:
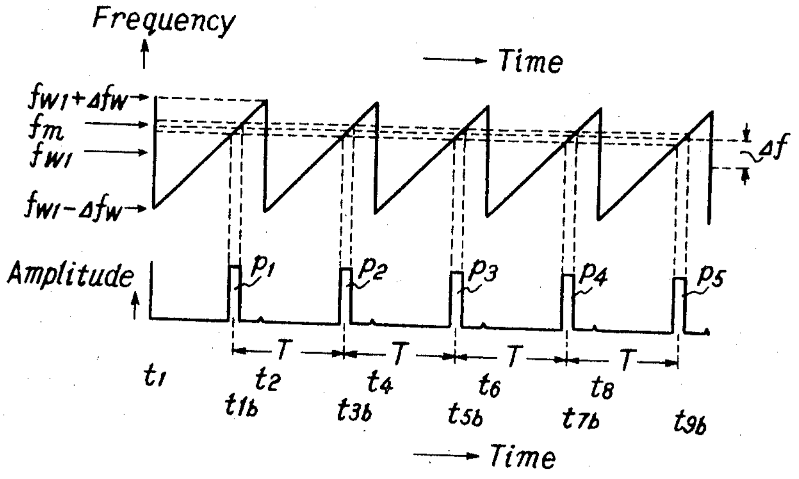
Figures 5A, 5B:
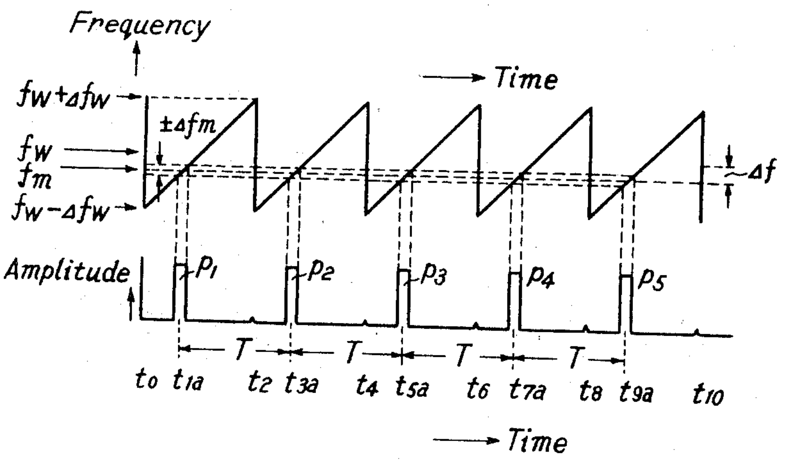

The system of this invention provides the feature that pulses of the pulse train P have the same periods T as to each other even if the center frequency of the filter 5 and/or the frequency range of the wobbled wave F$w$ is deviated by a small amount. The reason for this can be described as follows. FIGS. 4A and 4B show the case where the center frequency of the wobbling frequency $(fw\pm\Delta fw)$ is shifted by a frequency $\Delta f_2$ towards the frequency $(fw+\Delta fw)$. FIGS. 5A and 5B show the case where the center frequency of the filter 5 is deviated by a frequency $\Delta f_1$ towards the frequency $(fw-\Delta f)$. In this case, FIGS. 4A and 5A show the wobbling deviations similarly as FIG. 3A, and FIGS. 4B and 5B show the pulse trains P similarly as FIG. 3B. As will be easily understood from these illustrations, the period of the pulse train P is always equal to a value T. This feature of the system of the present invention is a desirable condition for design of the narrow-pass band filter 5 and for protection against undesirable interference waves. By employing this feature, pulses of the pulse train P can be reliably detected by the detection means 6. This detection means 6 determines whether or not the number of pulses of the pulse train P is equal to the number predetermined in accordance with the cue signal to be transmitted. Accordingly, a pulse counter of conventional type can be employed as the detection means. If the detection means 6 is a detection circuit (disclosed in the U.S. patent application of Ser. No. 313,030 filed on Oct. 1, 1963 and assigned to the same assignee; Kokusai Denki Kabushiki Kaisha) which is provided with an integrator for accumulatively storing voltages of successive pulses applied thereto at a period shorter than the time constant of the integrator and with a trigger circuit starting at a time when the storage voltage of the integrator reaches to a predetermined reference level, the detection operation can be reliably carried out without spurious triggering. The result of the detection operation of the detection means 6 is applied to an output terminal 7 to control an external object to be controlled.

As mentioned above, the number of cycles of the saw-tooth wave can be reliably transmitted by the system of this invention through a very narrow bandwidth. Moreover, the period of pulses of the pulse train P is always a constant period T. Accordingly, if the number of cycles of the saw-tooth wave and/or the duration of the saw-tooth wave is determined so as to correspond to a cue signal to be transmitted, this cue signal can be reliably transmitted by the system of this invention through a very narrow bandwidth.

In the system of this invention, values of the wobbling deviation $(fw\pm\Delta fw)$ and the bandwidth $(fm\pm\Delta fm)$ of the filter 5 can be selected arbitrarily under the aforementioned condition. However, it is desirable that the wobbling deviation $(fw\pm\Delta fw)$ be equal to several times the bandwidth $(\pm\Delta fm)$ or less than ten times the bandwidth $(\pm\Delta fm)$ to make the communication band narrower.

The wobbling means 1 and the oscillator 2 can be formed by any of the known conventional wobbled oscillators. An all-electronic circuit is suitable to reliably carry out the desired wobbling. By way of examples, it can be formed by an oscillator of the Wien bridge type. In this case, an electronic tube, the internal resistance of which can be changed from several hundred ohms to several megohms in accordance with the bias-voltage change of several volts, is connected in parallel to opposite terminals of the Wien bridge, so that the oscillation frequency can be changed more than 1% to produce the wobbled wave if the grid-bias voltage is changed along a desired saw-tooth wave. As another example, if the shaft of a variable condenser connected in parallel with the tank circuit of a L–C oscillator is rotated at a period $(1/T)$ round/second) in a crick motion (in which an instantaneous return-rotation is performed for every forward uniform-rotation), the L–C oscillator will generate a wobbled wave which is wobbled along a saw-tooth wave of a period T (seconds).

As the transmission medium for the system of this invention, coaxial cables or wire-lines can be employed. In this case, the selective amplifier is connected to the cable or the wire line. Moreover, the wobbled wave Fw can be applied, as it is without modulation, to the transmission line if the transmission line is suitable for transmitting a wobbled wave of low-frequency. To meet this requirement, the transmitter means 3 comprises only an amplifier for transmitting the wobbled wave Fw to the transmission line.

As mentioned above, the number of cycles of the saw-tooth wave can be reliably transmitted by the system of this invention. Accordingly, if the number of cycles of the saw-tooth wave assumes a plural distinct number of cycles which correspond respectively to a plurality of cue signals to be transmitted, the system of this invention is able to reliably transmit a plurality of cue signals by use of only one wobbled wave Fw, and thus is suitable for accomplishing frequency multiplexing.

Figure 6:
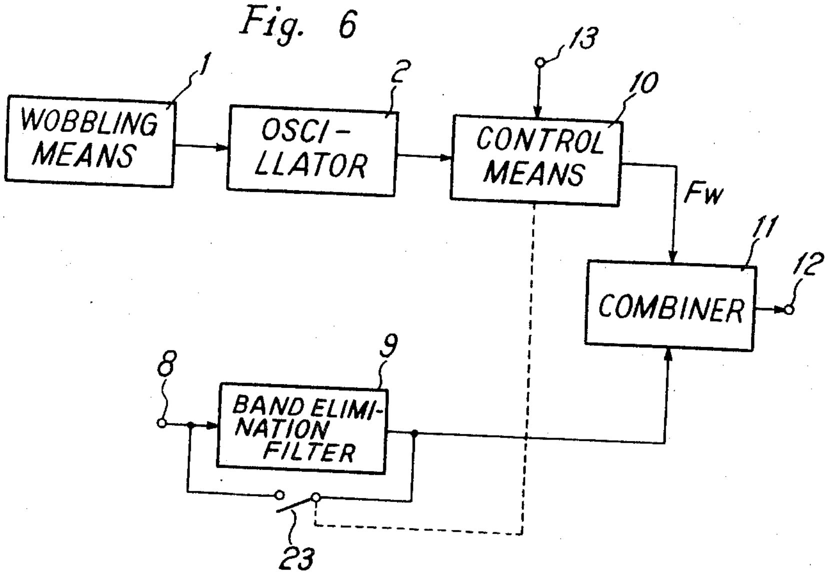
FIG. 6 is a block diagram for illustrating an embodiment of a cue signal generator employed in the system of this invention.
Figure 7:
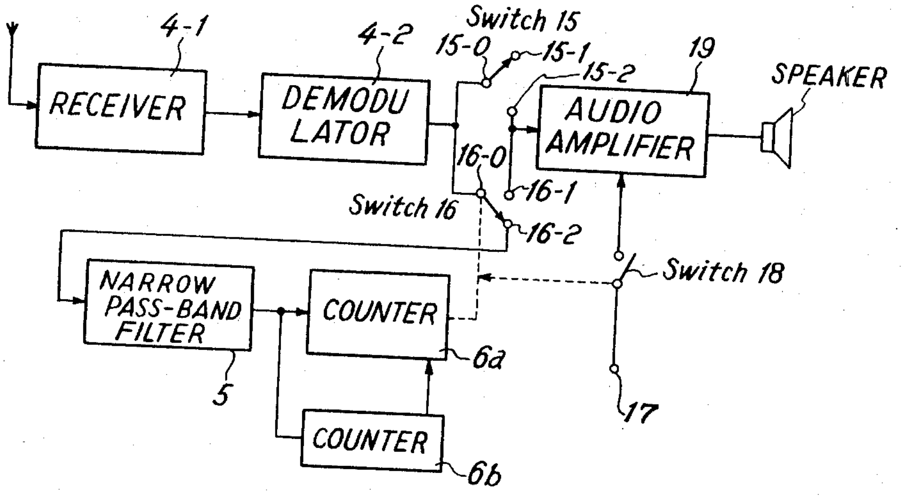
FIG. 7 is a block diagram illustrating an embodiment of a receiver side of the system of this invention in which system a cue signal or signals can be transmitted by use of a carrier wave of radio frequency.

Referring to FIGS. 6 and 7, an actual example of the system of this invention to transmit a cue signal of a broadcast system will be now described. In this example, the wobbled wave derived from the oscillator 2 is controlled at a desirable time in a control means 10, such as a relay of switch, by use of control information applied from a terminal 13, so that the saw-tooth wave included in the wobbled wave Fw has the number of cycles corresponding to a cue signal to be transmitted.

The control of the control means 10 can be carried out manually in monitoring the broadcast information. On the other hand, ordinary broadcast information, such as theme music or sound and ordinary program, is applied to a terminal 8. This information is applied to a band-elimination filter 9 the elimination bandwidth (e.g. 1,900 cycles/second ±15 cycles/second) of which is slightly wider than the wobbling deviation ($fw \pm \Delta fw$) of the wobbled wave Fw. Accordingly, the frequency components of the signal applied from the terminal 8 is eliminated only at the elimination bandwidth when a switch 23 is opened. However, this elimination does not adversely affect the quality of the program because of the narrowness of the elimination bandwidth. Moreover, if the switch 23 is opened only in response with the passing-period of the control means 10, the ordinary program can be broadcasted without any such elimination. The cue signal (the wobbled wave Fw) is superposed in a combiner 11, such as hybrid-transformer, on the introductory theme music or sound preceding to an ordinary program, such as regular news, weather forecasting, etc. The combined signal is applied to the modulator 3–2 of the transmitter means 3 through a terminal 12.

FIG. 7 shows the receiving side of this case in which remains are energized even if its audio output is muted in a waiting condition. The received and demodulated signal is derived from the demodulator 4–2 and applied to a switch 15 and a switch 16. The switch 15 can be manually controlled. If a contact 15–0 is connected to a contact 15–2, the demodulated audio signal is amplified in an audio-amplifier 19 and applied to a speaker 20 similarly as conventional radio set. On the contrary, if the contact 15–0 is turned from the contact 15–2 to a contact 15–1, this receiving side is set at an automatic receiving condition. At this condition, if the cue signal is received and demodulated, the demodulated cue signal (the wobbled wave Fw) is changed to a pulse train P at the narrow-pass band filter 5 as mentioned above. The number of pulses is counted at a counter 6a as mentioned above with reference to FIG. 2. If the number of pulses corresponds to a cue signal to be received, the output of the counter 6a controls the switch 16 so that a contact 16–0 is turned from a contact 16–2 to a contact 16–1. By this operation, the demodulated broadcast information can be heard from the speaker 20. If necessary, the output of the counter 6a is able to control a switch 18 so as to supply or break an electric power supplied from an electric source terminal 17 to the audio-amplifier 19. In actual equipment, it is desirable that the counter 6a produces a self-holding output which is manually or automatically released. If the system is designed so that a cue signal different from the cue signal for starting the operation of the audio amplifier 19 is transmitted (after the broadcast information to be heard by the listener) and then detected by another counter 6b, the self-holding of the output of the counter 6a can be automatically released by the output of the counter 6b as is shown in FIG. 7.

If a broadcast station has an ordinary radio channel as well as a T.V. channel, the user can turn on the T.V. receiver by means of the radio set controlled by the cue signal.

Figure 8:
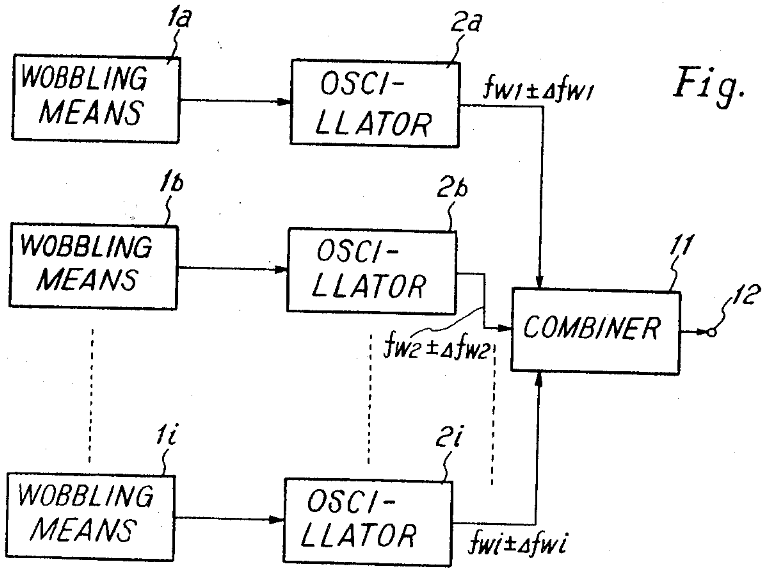
FIG. 8 is a block diagram illustrating an embodiment of a cue signal generator employed in the system of this invention in which a plurality of cue signals can be transmitted.
Figure 9:
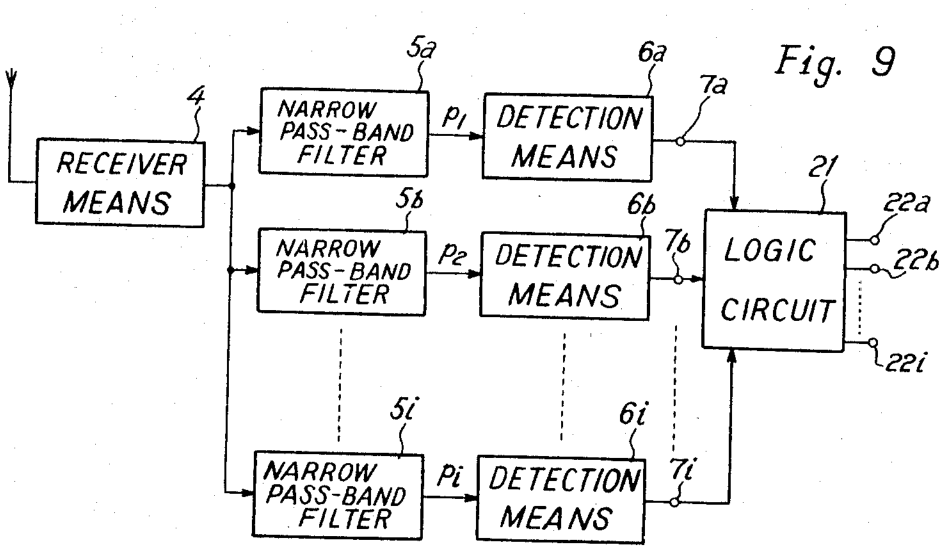
FIG. 9 is a block diagram illustrating another embodiment of the receiver side of the system of this invention in which system a plurality of cue signals can be transmitted.

The system of this invention can be formed by use of a plurality of wobbled waves (a plurality of cue signal channels). FIG. 8 shows an example of the transmitter side of this case and FIG. 9 shows an example of the receiving side of this case. The information to be transmitted is formed by one of a distinct combinations of a plurality of wobbled waves ($fw1 \pm \Delta fw1$), ($fw2 \pm \Delta fw2$) . . . ($fw_i \pm \Delta fw_i$) which are respectively generated at the wobbling means (1a, 1b . . . or 1i) and the oscillator (2a, 2b . . . or 2i) and combined at the combiner 11 to apply to the terminal 12 of the transmitter means 3. In this case, the frequency difference between two adjacent wobbled waves is larger than a frequency range $2\Delta f_{wi}$ so as to be sufficient for frequency multiplexing. A plurality of wobbled waves received and demodulated by the receiver 4 are respectively changed to pulse trains $P_1$, $P_2$ . . . $P_i$ at narrow-pass band filters 5a, 5b . . . 5$_i$. These pulse trains $P_1$, $P_2$ . . $P_i$ are respectively checked at detection means 6a, 6b . . . 6$_i$. Results of this checking are applied, through terminals 7a, 7b . . . 7$_i$ to a logic circuit 21 which determines the information corresponding to the combination of transmitted wobbled waves to supply the determined result to any of output terminals 22a, 22b . . . 22$_i$.

Figure 10:
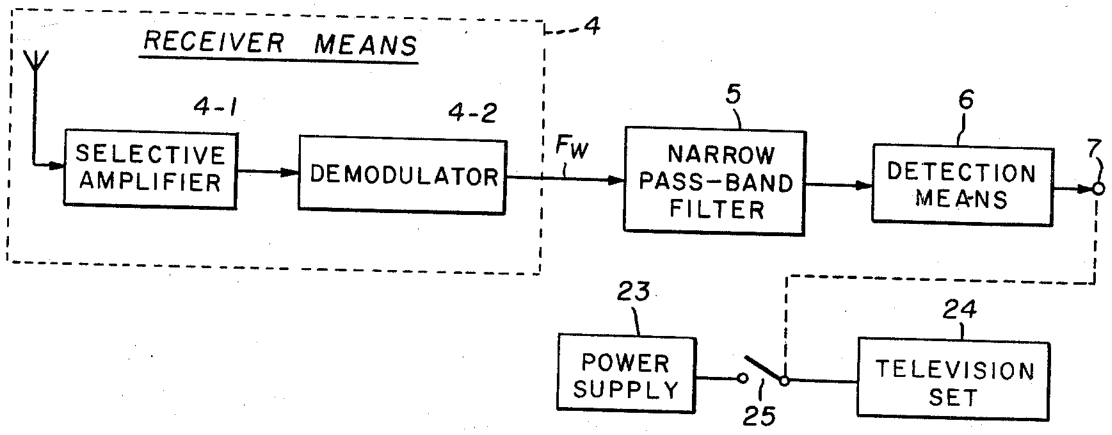
FIG. 10 is a block diagram of an embodiment of the receiver side of the system used to control an electromechanically correctable clock.
Figure 11:
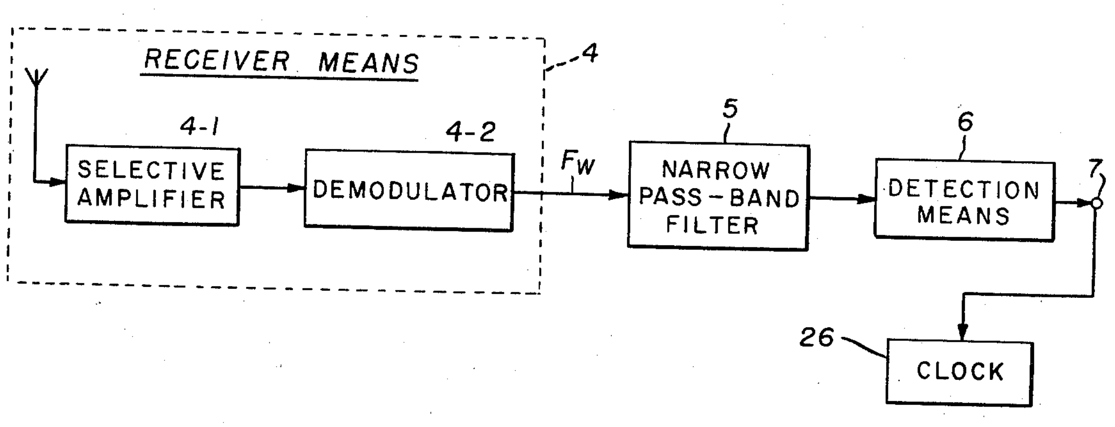
FIG. 11 is a block diagram of another embodiment of the receiver side of the system used to control a television set.

The system of this invention can be applied to remotely control any equipment as well as radio receivers. By way of examples a television set 24 may be remotely controlled, as shown diagrammatically in FIG. 10, or, an electro-mechanically correctable clock 26, such as shown diagrammatically in FIG. 11 can be remotely controlled by the system of this invention to actuate the correcting means to a desired correct time.

While we have described particular embodiments of our invention, it will, of course, be understood that we do not wish our invention to be limited thereto, since many modifications and changes may be made and we, therefore, contemplate by the appended claims to cover all such modifications as fall within the true spirit and scope of our invention.

What we claim is:

1. A system for transmitting a cue signal, comprising:

generator means for generating a wobbled wave by wobbling a low-frequency sinusoidal wave $f_w$ within a frequency range $f_w \pm \Delta f_w$ according to a saw-tooth function the number of cycles of which is determined in accordance with the cue signal to be transmitted, the wobbling frequency range $2\Delta f_w$ being much less than $f_w$;

transmitter means for transmitting the wobbled wave into a transmission medium;

a filter coupled with the receiver means and having a narrow-pass band considerably narrower than the wobbling frequency range $2\Delta f_w$ of the transmitted wobbled wave, conversion means rectifying and reshaping the output of the filter to produce a pulse train the period of pulses of which is substantially the same as that of the saw-tooth wave function and the number of pulses of which corresponds to the number of cycles of the saw-tooth wave function; and detection means coupled to the conversion means for determining the transmitted cue signal corresponding to the pulse train.

2. A system according to claim 1, including means in which the wobbled wave is transmitted through a narrow bandwidth which is established in a communication channel by eliminating, only at a time when the wobbled wave is to be transmitted, the frequency components of communication signal included into the narrow bandwidth.

3. A system according to claim 2, in which the communication channel is a broadcast radio channel.

4. A system according to claim 3, including means applying the output of the detection means to control a TV set.

5. A system according to claim 2, including means applying the output of the detection means to control a time-correction means of an electro-mechanically correctable clock.

6. A system according to claim 3, in which the output of the detection means unmutes the audio output of the broadcast radio channel.

7. A system according to claim 6, in which the unmuted audio output is muted by a second cue signal which is different from the first cue signal to unmute the audio output and transmitted through the transmission system equivalent to that of the first cue signal.

8. A system for transmitting a plurality of cue signals, comprising:

generator means for generating a plurality of wobbled waves by wobbling each of a plurality of low-frequency sinusoidal waves of different frequencies $f_{w1} \ldots f_{wi}$ within respective frequency ranges $f_{w1} \pm \Delta f_{w1} \ldots f_{wi} \pm \Delta f_{wi}$ according to a particular saw-tooth function the number of cycles of which is determined in accordance with a particular cue signal to be transmitted, the wobbling frequency ranges $2\Delta f_{w1} \ldots 2\Delta f_{wi}$ being much less than the corresponding low frequency sinusoidal waves $f_{w1} \ldots f_{wi}$ and the frequency difference between adjacent two of the wobbled waves being larger than the wobbling frequency ranges to an extent sufficient for frequency multiplexing;

transmitter means for transmitting the wobbled waves into a transmission medium;

receiver means for receiving the transmitted wobbled waves from the transmission medium;

a plurality of filters each coupled with the receiver means and each having a narrow-pass band considerably narrower than the wobbling frequency range $2\Delta f_{w1} \ldots 2\Delta f_{wi}$ of corresponding ones of the transmitted wobbled waves;

conversion means rectifying and reshaping the outputs of the filters to produce a plurality of pulse trains the periods of pulses of which are substantially the same as those of the respective saw-tooth functions and the numbers of pulses of which correspond respectively to the number of cycles of said saw-tooth functions; and detection means coupled to the conversion means for determining the transmitted cue signal corresponding to a combination of the pulse trains.

References Cited

UNITED STATES PATENTS

| | | | |
|---|---|---|---|
| 2,392,693 | 1/1946 | Purington | 325—35 |
| 2,422,664 | 6/1947 | Feldman | 325—131 |
| 2,766,381 | 10/1956 | Davis | 331—44 |
| 2,998,595 | 8/1961 | Gordon et al. | 340—207 |
| 3,210,666 | 10/1965 | Martin et al. | 325—64 |
| 3,297,889 | 1/1967 | Breskind | 331—107 |

THOMAS B. HABECKER, Primary Examiner

M. M. CURTIS, Assistant Examiner

U.S. Cl. X.R.

325—131; 331—47, 106; 340—207; 343—225